Aug. 6, 1968    J. LACZKO    3,395,942

VEHICLE WHEEL

Filed July 18, 1966

INVENTOR.
JOSEPH LACZKO
BY M. A. Hobbs
ATTORNEY

United States Patent Office 3,395,942
Patented Aug. 6, 1968

3,395,942
VEHICLE WHEEL
Joseph Laczko, 4916 N. Spaulding Ave.,
Chicago, Ill. 60625
Filed July 18, 1966, Ser. No. 565,816
4 Claims. (Cl. 301—63)

ABSTRACT OF THE DISCLOSURE

A vehicle wheel for a pneumatic tire in which the rim for the tire is constructed of two annular sections retained together by a plurality of spacer wedge-shaped, interlocking lugs and a plurality of locking fixtures having springs urging the two sections apart and the wedge-shaped lugs into firm interlocking relation.

---

In removing tires from a standard automobile, the entire wheel is demounted from the axle hub and the tire is pried from the rim. This operation usually necessitates removing the hub cap and five nuts from the wheel studs, and applying a separate tool or machine to slip the tire over the rim, using a substantial amount of force. This operation is not only time consuming and difficult, but often results is damage to the tire and sealing surface on the wheel rim, and hence shortens the life of the tire and may prevent an effective seal when the tire is again mounted on the wheel. It is therefore one of the principal objects of the present invention to provide an automobile wheel which permits the removal of the tire without demounting the wheel from the hub and which eliminates the necessity of prying the tire over the wheel rim or otherwise stretching or distorting the tire in mounting or demounting the tire.

Another object of the invention relates to a vehicle wheel for pneumatic tires, having a removable rim section which permits the tire to be removed from and mounted on the wheel by merely lifting the tire from the wheel to remove it, and setting it on the wheel to mount it in place, and which is so constructed and designed that the rim section can be easily and quickly removed without the use of any special tools or other equipment.

Still another object is to provide an automobile wheel of the aforesaid type having two separable rim sections, one section of which can be quickly removed from and mounted on the wheel by merely manipulating two securing means and slightly rotating the one section relative to the other, and both sections of which remain firmly attached to one another when assembled in operating position.

A further object of the invention is to provide an automobile wheel having the foregoing features and advantages, which is relatively simple in construction and operation and which can readily be adapted to the conventional automobile hubs and can easily and effectively be used to convert standard automobile wheel construction to a quick tire change construction.

Additional objects and advantages of the invention will become apparent from the following description and accompanying drawings, wherein.

Referring more specifically to the drawings, numeral 12 designates generally an automobile wheel having a hub portion (not shown) of conventional construction with a plurality of holes for securing the wheel to the hub of the automobile axle. The specific structure for securing the wheel to the axle does not form a part of the present invention and any suitable structure may be used. The wheel consists of an outer rim 14 and an inner rim 16, the two rims having external flanges 18 and 20, respectively, for retaining a pneumatic tire in place. Rim 16 is joined integrally with the hub which in turn is mounted rigidly on the hub of the axle by the aforementioned plurality of bolts or studs and nuts.

Figure 2:
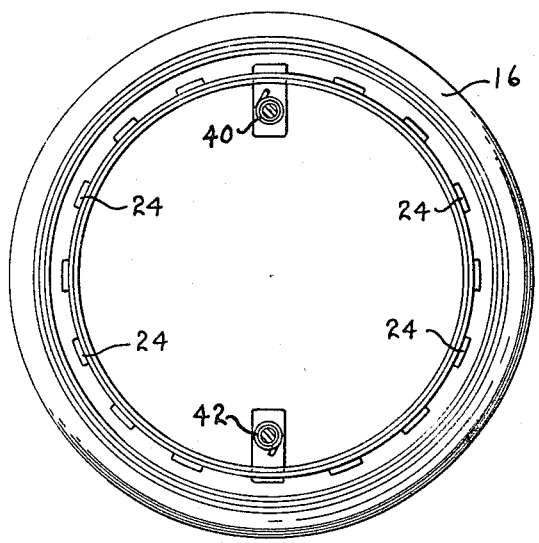
FIGURE 2 is an elevational view of one of the rim sections of the wheel shown in FIGURE 1, the elevational view indicated by line 2—2 of the latter figure.
Figure 5:
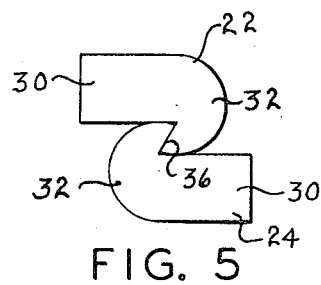
FIGURES 5 and 6 are enlarged plan view of other securing fixtures, showing the fixtures in their secured and unsecured positions, respectively.
Figure 6:
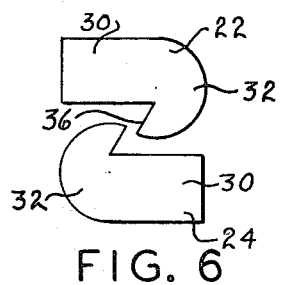

Rim section 14 is secured to rim section 16, when the tire has been mounted in place on rim section 16, by a plurality of interlocking fixtures 22 and 24 on rim sections 14 and 16, respectively, and as seen in FIGURE 2, there are sixteen interlocking lugs equally spaced around the periphery of the inner portions 26 and 28 of the two rim sections 14 and 16, respectively. Each lug is provided with a base portion 30 and a head portion 32 having a wedge-shaped edge 36 for engaging the corresponding wedge-shaped edge of the opposed lug. When the two interlocking lugs have been firmly engaged, as illustrated in FIGURE 5, the wedge-shaped, beveled edges 36 are in firm engagement with one another, thus holding the two rim sections together. The lugs 22 and 24 are welded or otherwise firmly secured to the respective rim sections and are interlocked with one another by placing rim section 14 into axial alignment with rim section 16 with the lugs angularly spaced from one another and with the wedge-shaped portions facing one another. Section 14 is then rotated to bring the two wedge-shaped edges together.

Figure 3:
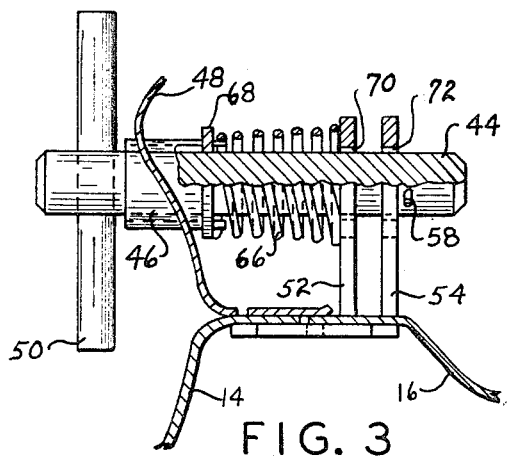
FIGURE 3 is an enlarged partial cross sectional and elevational view of one of the securing fixtures embodied in the present invention.
Figure 4:
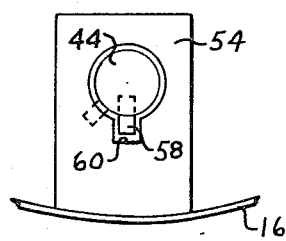
FIGURE 4 is an end view of the fixture shown in FIGURE 3.

The lugs are retained in interlocking engagement with one another and the two rim sections 14 and 16 are held in position by a pair of latching fixtures 40 and 42 having one portion mounted on rim section 14 and another portion mounted on rim section 16. Each latching means consists of a shaft 44, reciprocably mounted in a sleeve 46, permanently secured to wheel portion 48 and having a handle 50 on the outer end of shaft 44 for use in locking and unlocking the securing means. The inner end of the shaft extends through holes in members 52 and 54 rigidly secured to rim section 16 and is provided with a pin 58, and the members are provided with a slot 60 through which the pin will pass in the locking and unlocking operations. When the pin has passed through the slot in the locking operation, the shaft is turned, thereby placing the pin over a portion of the member to lock the shaft in place. A coil spring 66 is mounted on shaft 44 between sleeve 46 and pin 58, a washer 68 preferably being provided between the spring and the sleeve. When rim section 14 is mounted in place and rotated to engage lugs 22 and 24, the right-hand end of shaft 44, as viewed in FIGURE 3, is slipped through holes 70 and 72 in members 52 and 54 and the shaft is rotated to cause pin 58 to engage the outer surface of member 54. With shaft 44 in this position, spring 66 reacts between sleeve 46 and member 52, thus urging rim section 14 outwardly, i.e. away from rim section 16, thereby pulling the wedge-shaped edges 36 of lugs 22 and 24 into firm engagement with one another and securing the two rims together.

Figure 1:
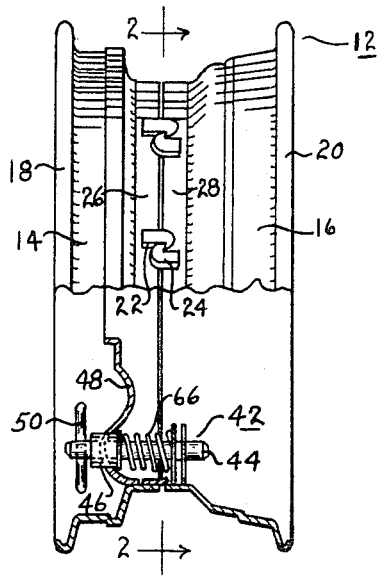
FIGURE 1 is an elevational and partial cross sectional view of an automobile wheel embodying the present invention, showing the wheel with the tire removed.

In the operation of the present wheel, when a tire is to be mounted on the rim, section 14 is removed from section 16. The tire is then mounted on rim 16 by merely setting it on the peripheral surface of the rim against flange 20. Rim section 14 is then inserted through the center of the tire with lugs 22 spaced from lugs 24, and rotated until the two lugs are in engagement with one another, as illustrated in FIGURES 1 and 5. Shaft 44 of each fixture 40 and 42 is then pressed inwardly with pin 58 passing through slot 60 and is turned until the pin is in engagement with the side member 54. When the shaft is in this position, coil spring 66 constantly urges the two rims apart, causing the wedge-shaped edges of the respective lugs 22 and 24 to firmly engage one another and to hold the rim sections in place. With the two sections together, the tire is held firmly between the two flanges 18 and 20 where it remains until it is demounted by releasing shaft 44 from the two members 52 and 54 and rotating rim section 14 to disengage lugs 22 from lugs 24.

The present rim may be used with either the tube or tubeless tires. When tubeless tires are used, a sealing gasket is required between the two rim sections 14 and 16 to make an airtight joint therebetween. It is seen that with the present wheel structure, the rim can easily be disassembled and the tire removed without stretching, distorting or otherwise damaging the tire, and without applying any substantial amount of force to either the tire or the rim. This operation can be performed quickly by merely loosening the two securing means 40 and 42 and rotating rim section 14 sufficiently to disengage lugs 22 and 24, thus eliminating the more difficult and tedious operation of removing the nuts from the studs on the axle hub and prying the tire from a one-piece conventional rim.

While only one embodiment of the present invention has been described in detail herein, various changes and modifications may be made without departing from the scope of the invention.

I claim:
1. A vehicle wheel for a pneumatic tire comprising a rim having two separable annular sections, one of said rim sections being adapted to be mounted on an axle hub of the vehicle and having a flange on its outer edge and a reduced diameter annular portion at its inner edge, the other of said rim sections having a flange on its outer edge and a reduced diameter annular portion at its inner edge, releasable means for securing said rim sections together for supporting a tire thereon between said flanges, including a plurality of wedge-shaped, interlocking lugs spaced around the reduced diameter portion of said sections for engaging one another when the two rim sections are juxtaposed, a latching fixture having a shaft extending through openings in each of said rim sections, and a spring reacting between abutments mounted on each of said rim sections urging the two rim sections apart and said wedge-shaped edges of said corresponding lugs into firm engagement with one another.

2. A vehicle wheel as defined in claim 1, in which the reduced diameter annular portion of said other rim section is of the same diameter as the reduced diameter portion of said one rim section.

3. A vehicle wheel as defined in claim 1, in which two latching fixtures diametrically positioned with respect to one another are provided for securing the rim sections together.

4. A vehicle wheel as defined in claim 3, in which the reduced diameter portions of the two rim sections are of the same diameter.

References Cited

UNITED STATES PATENTS

| | | | |
|---|---|---|---|
| 3,006,692 | 10/1961 | Schubert | 301—63 |
| 3,007,507 | 11/1961 | Sinclair | 301—63 |

FOREIGN PATENTS

| | | |
|---|---|---|
| 240,772 | 10/1925 | Great Britain. |
| 339,081 | 12/1930 | Great Britain. |

RICHARD J. JOHNSON, *Primary Examiner.*